(12) United States Patent
Gerhardt et al.

(10) Patent No.: US 9,110,572 B2
(45) Date of Patent: Aug. 18, 2015

(54) NETWORK BASED VIDEO CREATION

(71) Applicant: Visible Spectrum, Inc., Burr Ridge, IL (US)

(72) Inventors: Baron Gerhardt, Wonder Lake, IL (US); John Malec, Chicago, IL (US); Sam Melton, Aurora, IL (US); Aaron Taylor, Palos Hills, IL (US)

(73) Assignee: Visible Spectrum, Inc., Chicago, IL (US)

( * ) Notice: Subject to any disclaimer, the term of this patent is extended or adjusted under 35 U.S.C. 154(b) by 235 days.

(21) Appl. No.: 13/758,109

(22) Filed: Feb. 4, 2013

(65) Prior Publication Data

US 2014/0223308 A1    Aug. 7, 2014

(51) Int. Cl.
*G06F 3/00* (2006.01)
*G06F 3/0484* (2013.01)
*G06T 11/00* (2006.01)
*G06T 15/02* (2011.01)

(52) U.S. Cl.
CPC ............... *G06F 3/0484* (2013.01); *G06T 11/00* (2013.01); *G06T 15/02* (2013.01)

(58) Field of Classification Search
CPC .................................................... G06F 3/0484
USPC .......................................................... 345/419
See application file for complete search history.

(56) References Cited

U.S. PATENT DOCUMENTS

| | | | |
|---|---|---|---|
| 6,292,827 B1 * | 9/2001 | Raz ............................... | 709/217 |
| 7,315,983 B2 | 1/2008 | Evans et al. | |
| 7,639,250 B2 * | 12/2009 | Xu et al. ........................ | 345/419 |
| 7,673,237 B2 | 3/2010 | Evans et al. | |
| 7,698,719 B2 | 4/2010 | Evans et al. | |
| 7,707,081 B2 | 4/2010 | Evans et al. | |
| 7,774,715 B1 | 8/2010 | Evans | |
| 7,890,873 B2 | 2/2011 | Evans | |
| 8,091,031 B2 | 1/2012 | Evans | |
| 8,791,942 B2 * | 7/2014 | Rivers et al. .................. | 345/419 |
| 8,831,273 B2 * | 9/2014 | Karafin et al. ................ | 382/100 |

(Continued)

FOREIGN PATENT DOCUMENTS

WO    0101686 A1    1/2001

OTHER PUBLICATIONS

Chen et al., The Video Mesh: A Data Structure for Image-based Three-dimensional Video Editing; © 2011; IEEE; 8 pages.*

(Continued)

*Primary Examiner* — Linh K Pham
(74) *Attorney, Agent, or Firm* — Fitch, Even, Tabin & Flannery LLP

(57) ABSTRACT

A computing device is configured to provide over a network an ability to create a 2.5D full motion custom multi-media file. In one example, a computing device makes available to a user a plurality of stored video templates into which a user may insert custom video, photos, and/or text. The computing device provides a low resolution preview of the custom video to the user over the network connection. The user then has the ability to edit the custom video prior to finalization. The computing device receives signals indicating purchase or licensing credentials and in response to receiving such credentials, finalizes and delivers a 2.5D video for the user. So configured, a user can relatively cheaply and quickly create video content such as an advertisement having modern visual features such as 2.5D video in a cost efficient and timely manner.

39 Claims, 12 Drawing Sheets

(56) References Cited

U.S. PATENT DOCUMENTS

| | | | |
|---|---|---|---|
| 2002/0031756 A1 | 3/2002 | Holtz et al. | |
| 2003/0169299 A1* | 9/2003 | Kusano et al. | 345/810 |
| 2005/0248560 A1* | 11/2005 | Agrawala et al. | 345/418 |
| 2007/0244753 A1 | 10/2007 | Grouf et al. | |
| 2008/0040217 A1 | 2/2008 | Dellovo | |
| 2008/0140502 A1 | 6/2008 | Birnholz et al. | |
| 2008/0184288 A1 | 7/2008 | Lipscomb | |
| 2010/0211621 A1 | 8/2010 | Hariharan et al. | |
| 2010/0321575 A1* | 12/2010 | Huang et al. | 348/569 |
| 2010/0324997 A1 | 12/2010 | Evans | |
| 2011/0035255 A1 | 2/2011 | Dasher et al. | |
| 2012/0069051 A1* | 3/2012 | Hagbi et al. | 345/633 |
| 2012/0075284 A1* | 3/2012 | Rivers et al. | 345/419 |
| 2012/0102403 A1* | 4/2012 | Pennington et al. | 715/719 |
| 2012/0106785 A1* | 5/2012 | Karafin et al. | 382/103 |
| 2013/0063487 A1* | 3/2013 | Spiegel et al. | 345/633 |
| 2013/0346302 A1* | 12/2013 | Purves et al. | 705/40 |
| 2014/0007196 A1* | 1/2014 | Lin | 726/4 |
| 2014/0233849 A1* | 8/2014 | Weng et al. | 382/154 |
| 2014/0244804 A1* | 8/2014 | Ying et al. | 709/219 |

OTHER PUBLICATIONS

Mohamed et al.; Motion Vector Search for 2.5D Modeling of Moving Objects in a Video Scene; © 2005; IEEE; 4 pages.*

Tamagawa et al.; Developing a 2.5-D Video Avatar; © 2001; IEEE; 8 pages.*

Baek, Asta et al.; "Semantically Supported Media Services with User Participation"; VTT Publications 612; VTT Technical Research Centre of Finland; Valopaino Oy, Helsinki 2006; 106 pages.

Spotmixer; Video Ads, TV Ads, Video Marketing and Hosting-SpotMixer; webpage, http://www.spotmixer.com/create_video/howitworks; Copyright 2011, SpotMixer, Inc.; 2 pgs.

Spotmixer; "FAQ-SpotMixer-Create Video Ads for Online Video and TV Advertising"; webpage, http://www.spotmixer.com/create_video/faq?pg=01; Copyright 2011, SpotMixer, Inc.; 1 page.

Spotmixer; "Create Your Video Ad for the Google TV Ads"; webpage, http://www.spotmixer.com/create_video/quick_create_precreated?partner . . . ; Copyright 2011, SpotMixer, Inc.; 1 page.

Spotmixer; "What's New"; webpage, http:www.spotmixer.com/create_video/whatsnew; Copyright 2011, SpotMixer, Inc.; 1 page.

* cited by examiner

Fig. 5 SYSTEM OVERVIEW

MEDIA INGEST

INGEST PROCESSING

QUALITY CHECK & CORRECTIONS

CONTENT RENDERER

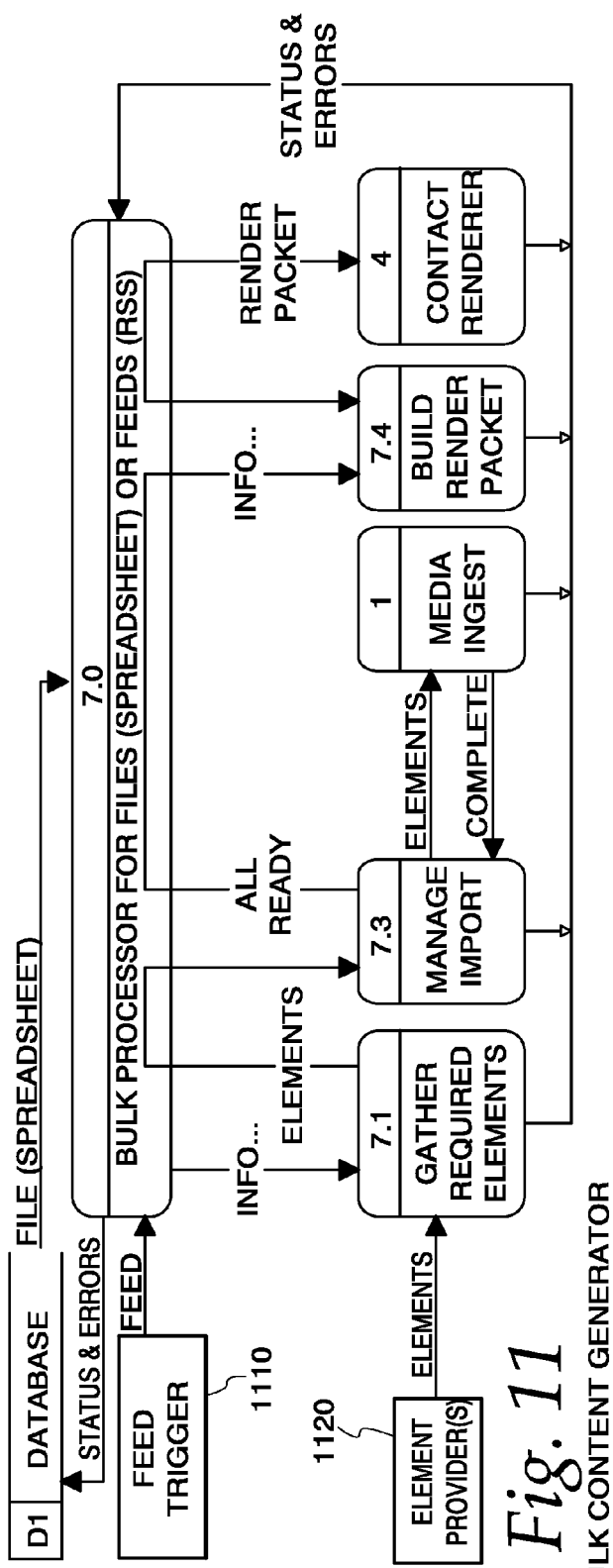
Fig. 11 BULK CONTENT GENERATOR
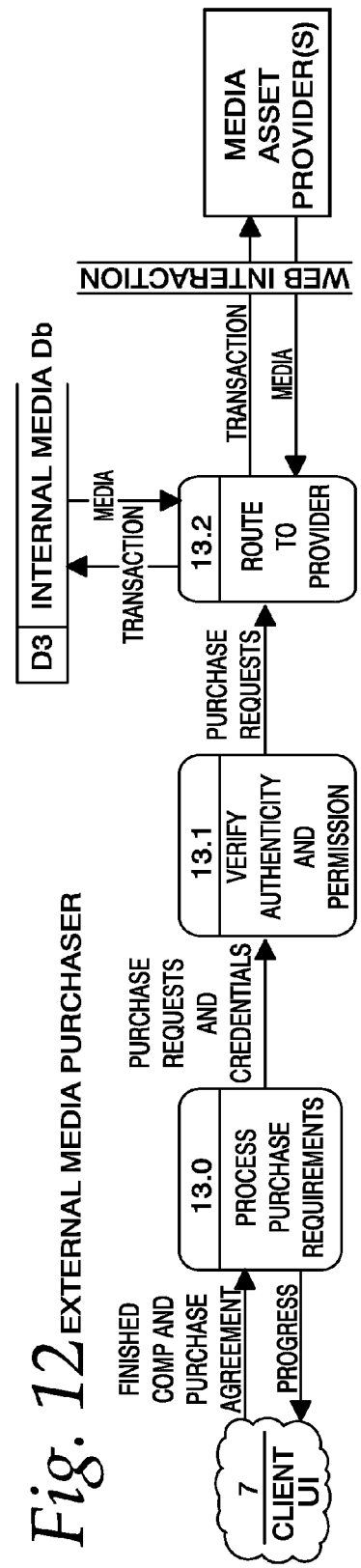
Fig. 12 EXTERNAL MEDIA PURCHASER

SEARCH AGGREGATOR

NETWORK BASED VIDEO CREATION

COMPUTER PROGRAM LISTING APPENDIX

Computer program listings written in ActionScript, JavaScript, and PHP, co-filed with EFS-Web, and identified as follows are incorporated by reference as if fully re-written herein: VideoComponent.txt (16 kilobytes), TemplateProcessor.txt (23 kilobytes), MetaDisplay.txt (25 kilobytes), BezierInterpolator.txt (5 kilobytes), and contentCreator.txt (108 kilobytes).

COPYRIGHT NOTICE

The computer program listings portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The invention relates generally to network available video editing technology and, more specifically to network based video creation.

BACKGROUND

It is generally known that advertising products and services can result in increased sales for the company or products featured in the advertising. Advertising can come in a variety of forms including print ads, static or near-static on-line advertising, or video based advertising. Because video based advertising can convey more information and many situations video advertising can be therefor preferred.

Producing a video advertisement, however, can be quite pricey. Equipment for producing the video must be purchased or rented and software for combining together the various aspects of a video can also be expensive. In particular, where modern advertising generally includes various graphics and video effects to catch the intended audience's attention. Such effects can be difficult to integrate into a video form.

Various methods are known for creating print advertisement using a computer based editing approach. Such systems for creating print advertising, however, cannot handle the complexities involved with combining various video elements desired for modern advertising.

SUMMARY

Generally speaking and pursuant to these various embodiments, a computing device is configured to provide over a network an ability to create a 2.5D full motion custom multi-media file. The term "2.5D" refers to two and a half dimensional video or two dimensional video that shows a series of images that gives the impression of watching a three dimensional video. In one example, a computing device makes available to a user a plurality of stored video templates into which a user may insert custom video, photos, and/or text. The computing device provides a low resolution preview of the custom video to the user over the network connection. The user then has the ability to edit the low resolution custom video by manipulating the template prior to finalization. The computing device receives signals indicating purchase or licensing credentials and in response to receiving such credentials, finalizes and delivers a 2.5D video for the user. So configured, a user can relatively cheaply and quickly create video content such as an advertisement having modern visual features such as 2.5D video in a cost efficient and timely manner. These and other benefits may become clear upon making further review and study of the following detailed description.

BRIEF DESCRIPTION OF THE DRAWINGS

The above needs are at least partially met through provision of the network based video creation described in the following detailed description, particularly when studied in conjunction with the drawings, wherein:

FIG. 11 comprises a block diagram of an example bulk content generator as configured in accordance with various embodiments of the invention;

FIG. 12 comprises a block diagram of an example process to facilitate external medial purchased as configured in accordance with various embodiments of the invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Figure 1:
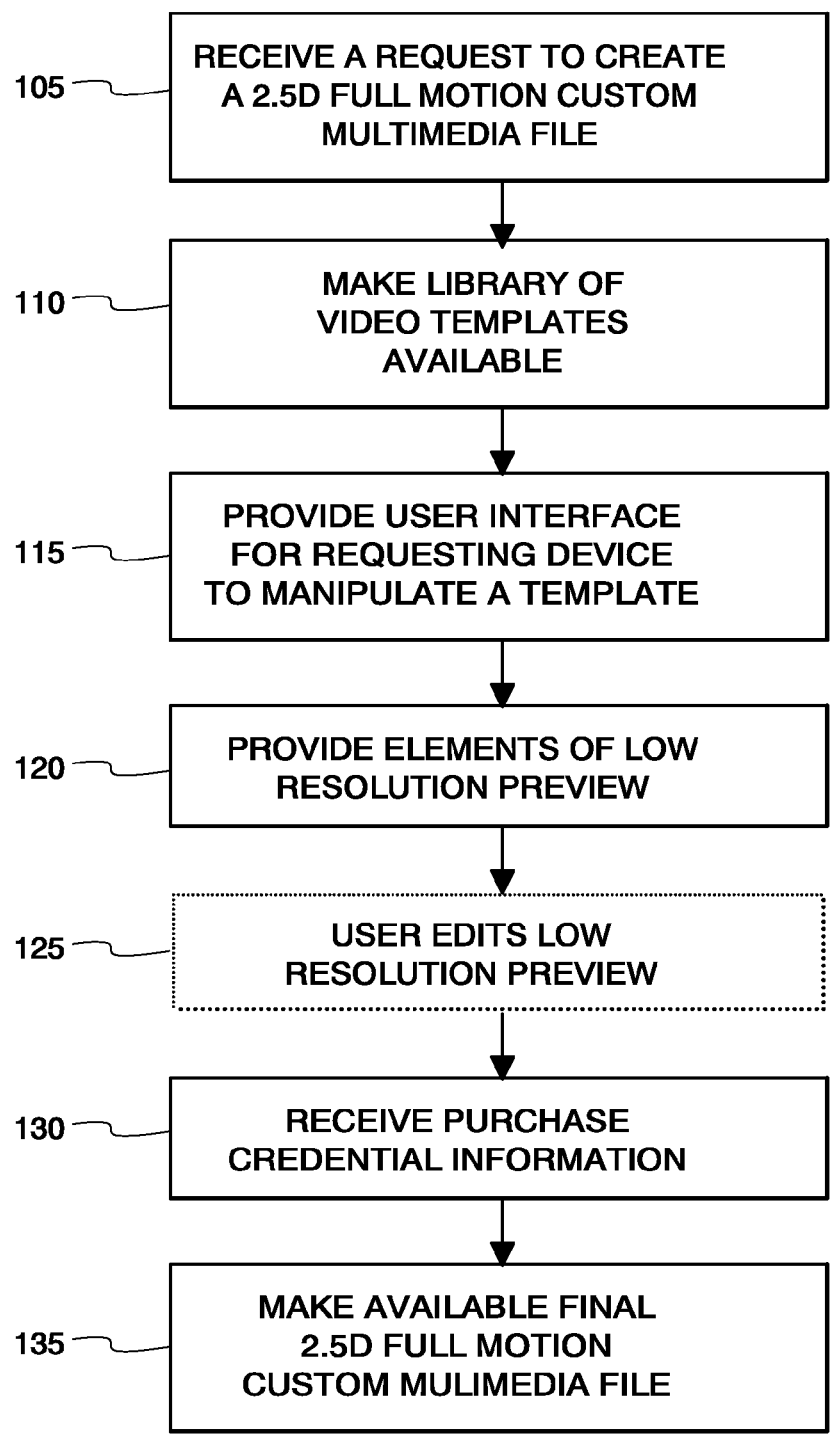
FIG. 1 comprises a flow diagram of an example method of providing the ability to create a 2.5D full motion custom multi-media file over a network connection as configured in accordance with various embodiments of the invention.

Referring now to the drawings and, in particular to FIG. 1, an illustrative process that is compatible with many of these teachings will now be presented. The method 100 of FIG. 1 includes receiving 105 by a computing device over a network a request from a requesting computing device to create a 2.5D full motion custom multi-media file. The computing device makes 110 a library of stored video templates available to the requesting computing device. In one example, the computing device provides signals to the requesting computing device to effect presentation of media available for purchase from third parties over an internet-based transaction. In other words, a user interface is provided, for example, through a web browser or through another computer based application, such that a user desiring to create a multi-media file can access a library of video templates to use in creating the user's custom file. The templates themselves are videos that can be manipulated using a user interface in a variety of ways to create a custom multi-media file.

For example, a library of stored videos can be accessed for a user to include within a given template. The video library may include videos aggregated from a variety of sources, including cloud-based storage libraries, videos created by the entity providing the capability to make a custom file, videos available by license, and other videos collected and processed to work within the system as described in further detail below.

One example for making 110 the library of stored video templates available includes receiving a media packet from a media providing computing device. In this approach, a media packet from a third party is downloaded from the separate media providing computing device controlled by a third party that owns or created the media. Once integrated into the current system, the media can then be made available to a user to serve as the basis of or be incorporated into a user's given custom multi-media file. After receiving the media packet from the media providing computing device, the media packet is processed with the computing device to determine errors in the media contained in the media packet. Additionally, the media packet can be processed by the computing device to extract metadata associated with the media packet and to extract assets other than the media from the media packet. Such assets can include any additional information related to the media, its use, or its content. The media metadata and assets are then stored in a storage device configured to make the media available to the requesting computing device in accord with the metadata. For instance, a particular media packet may come with certain use restrictions as may be defined in metadata associated with the media packet. The storage device can then store the metadata in association with the media such that use restrictions can be respected when making the media packet available to other users.

With respect to processing the media packet to determine errors within the media packet, the computing device may verify the media's file type and integrity. If there are problems with the media, the computing device can perform quality corrections to the media to create a corrected media file. The corrected media file can be transcoded to create a transcoded media file. Transcoding the media file standardizes the video for easier processing when creating to the full motion custom multi-media file for the user. In one approach, all video data is transcoded or converted to flash video and all still images are converted to JPEG or PNG type files. The computing device then returns the transcoded media file and data regarding the media's quality for storage. So configured, media from virtually any source can be incorporated into the system and made available to users in preparing custom video for their personal or business uses.

With reference again to FIG. 1, in response to receiving an indication of selection of a video template from the library of stored video templates, the computing device provides 115 a user interface for the requesting computing device to manipulate the template. The computing device also provides 120 elements of a low resolution preview of the 2.5D full motion custom multi-media file over the network for playback at the requesting computing device. The template is configured to allow the requesting computing device of a user to edit or manipulate 125 the elements of the low resolution preview of the 2.5D full motion custom multi-media file. Accordingly, the requesting computing device may periodically send during the editing process, and the computing device receives, signals to effect updating the low resolution preview. When the editing process is complete, the requesting computer sends, and the computing device receives, signals to effect creation of the full resolution 2.5D full motion custom multi-media file.

So configured, because the editing is done locally on the user's computing device, network bandwidth resources and the providing computing device's processing resources are conserved. The user also experiences reduced network transmissions related processing delays during the editing process. In one example, there is no network load during a user's editing text, placing elements, or changing filters during editing. In still another example, although adding new video images and/or audio to a file can increase network load, such files are generally the low resolution files that minimize this impact. Because the working version of the video is low resolution, and optionally watermarked, it is unlikely that a user will capture or otherwise use the low resolution version of the multi-media file, thereby largely ensuring that the user will proceed with payment to the service provider when an acceptable final product is produced.

The editing of the templates will vary depending upon what the user wants in the final video and what the capabilities and design of the given template are. For example, one given template may include a variety of video that includes animations and movement, which have embedded therein blank spaces into which a user may enter text, images, or additional video. The template itself is built from a markup language for describing the composition and movement of video elements in a 2.5D space. The video elements may include external audio, image, and video elements or internal text and simple shape elements. External elements are fetched as separate files and may be provided by the computing device executing the method or from third party devices. Internal elements are directly rendered from data in the given template using method to search, preview, add via user upload, and license external content.

Figure 2:
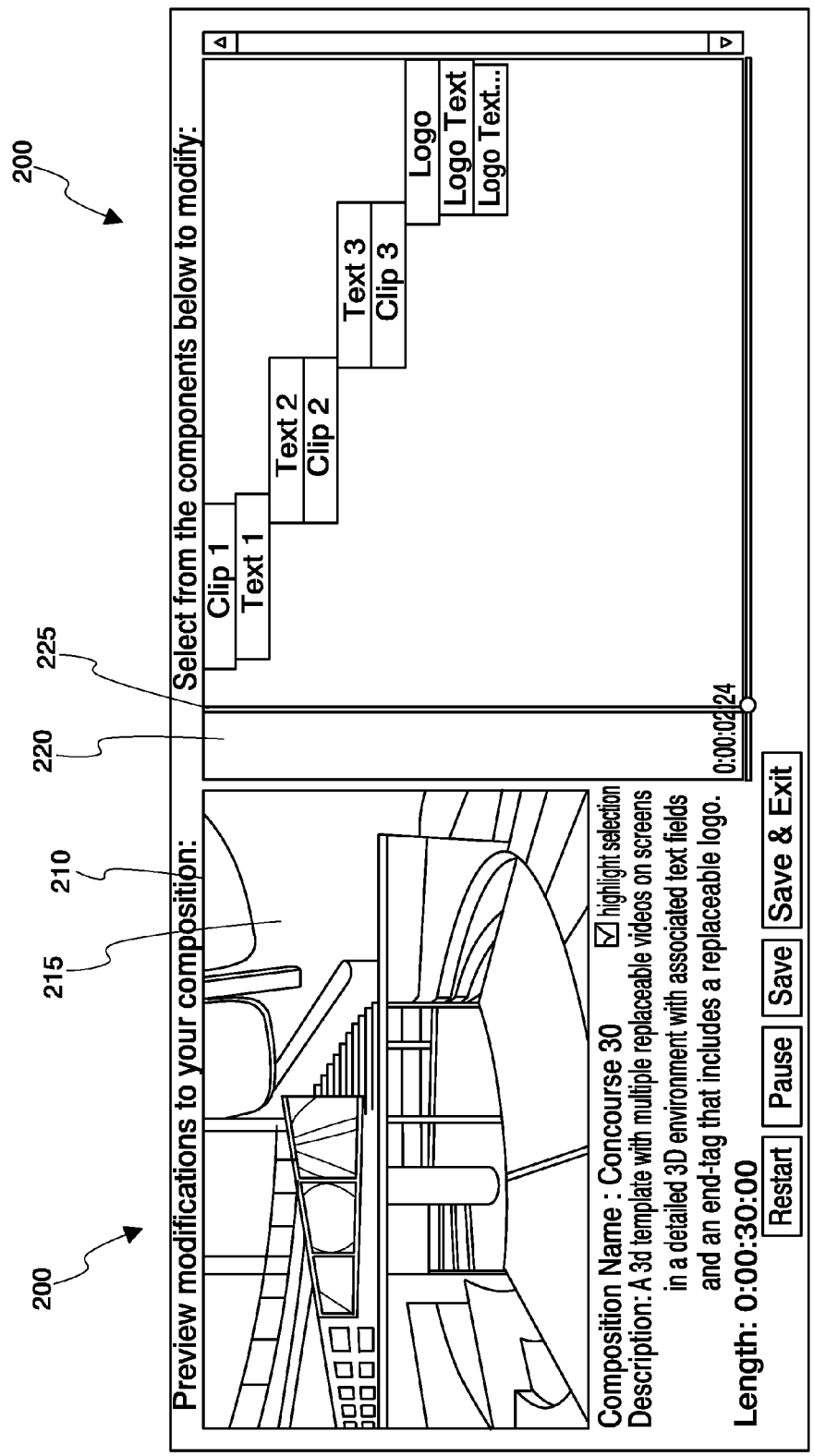
FIG. 2 comprises an illustration of an example user interface for previewing and editing video as configured in accordance with various embodiments of the invention.
Figure 3:
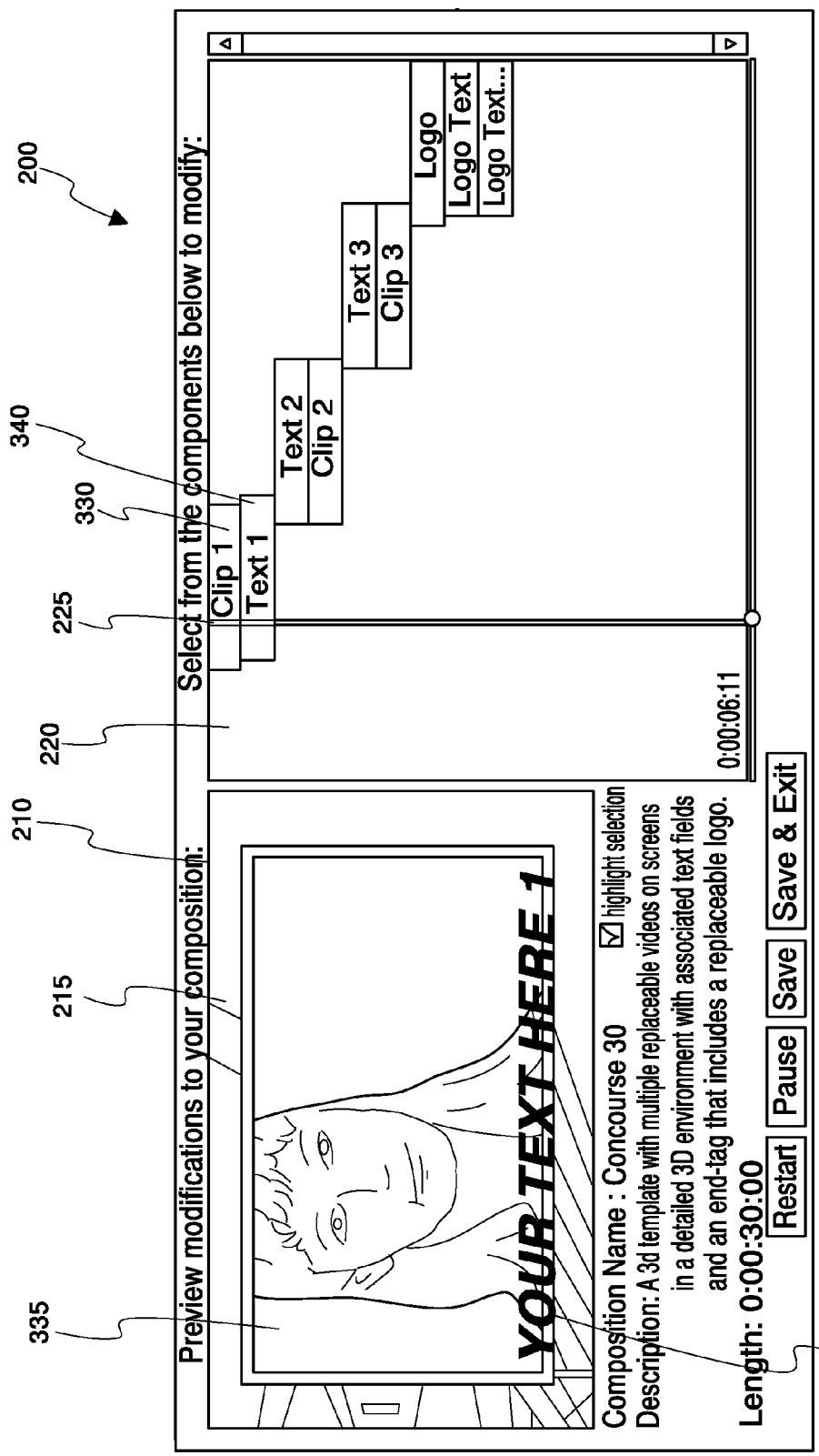
FIG. 3 comprises a further illustration of the example user interface of FIG. 2.
Figure 4:
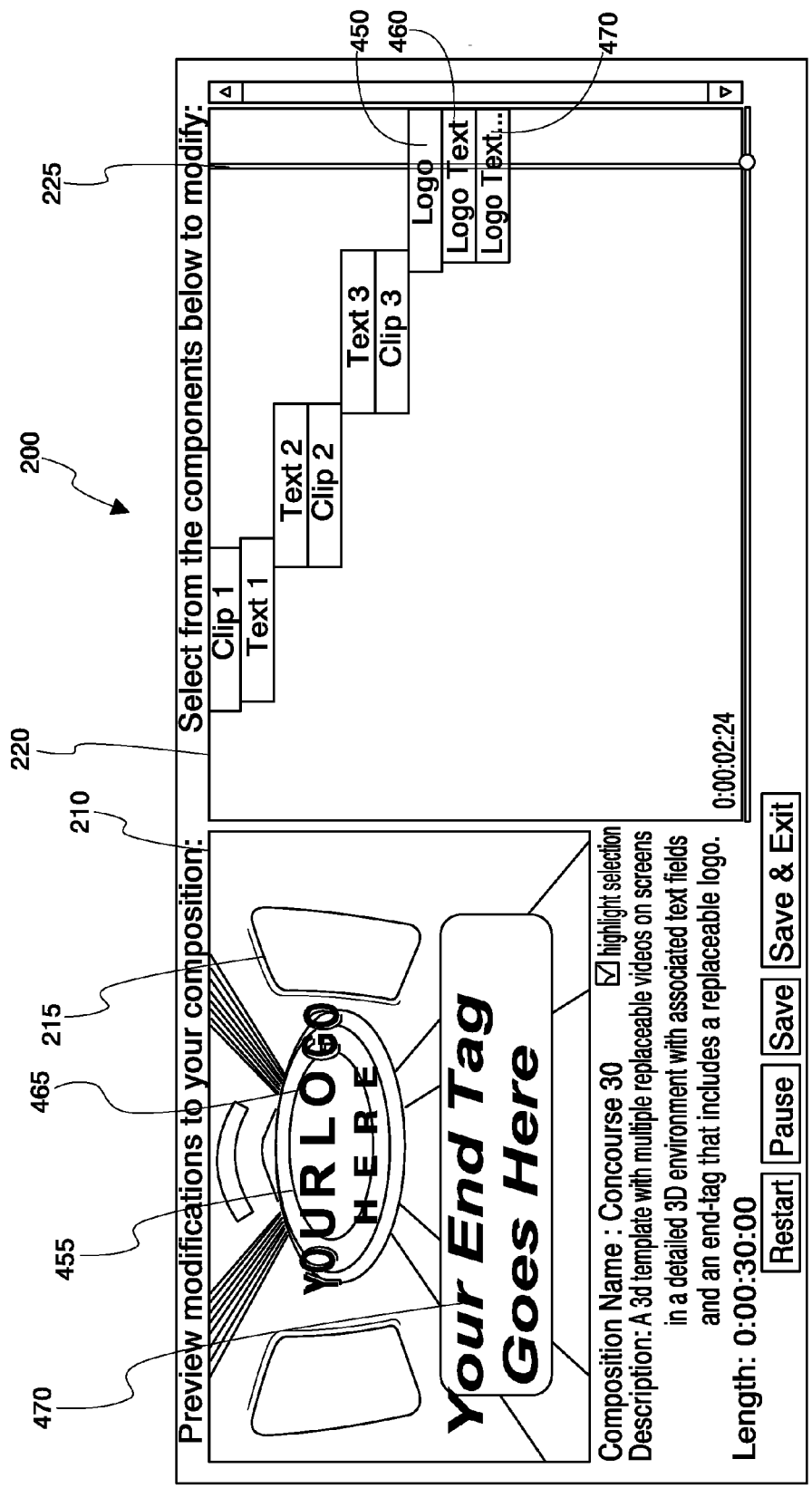
FIG. 4 comprises a further illustration of the example user interface of FIG. 2.

FIGS. 2, 3, and 4 illustrate an example user interface 200 that can be provided to a user from the computing device to allow the user to edit a video template. The user interface 200 includes a preview window 210 that displays the template being edited by the user. In this example, the template includes a motion video 215 depicted within the window 210. A second window 220 illustrates a timeline for the displayed template and elements (illustrated here as boxes) representing the user modifiable portions of the template. A time indicator line 225 shows where the template displayed in the preview window 210 is on its playback timeline. The boxes are oriented within the window 220 according to the time during the template at which the respective user editable portion is visible. The user interface 200 can also include additional information such as the template-based working video's name, a short description of the working video, the length of the working video, and various buttons to control the playback and to control saving the working video.

As the working video or template advances in time, and with reference to FIG. 3, the time indicator 225 overlaps with an element labeled "clip 1" 330, which illustrates where a video clip can be inserted into the template played in the window 210. The illustrated example template at this point in time includes the video template imagery 215 illustrated in the background of the window 210 and a portion of the video 335 that displays the clip as selected by the user. Further, element 340 is labeled "text 1" to illustrate a portion of the template that is user editable at this portion of the video template. The text is displayed in the window 210 at the illustrated portion 345 of the video.

FIG. 4 illustrates yet another example of the template editing interface illustrated in FIGS. 2 and 3, now at the time indicated by the time bar 225 towards the end of the template. In this example, the element 450 indicates that a logo can be inputted and displayed at the portion 455 of the template illustrated in window 210. The logo would overlap the other video playing in the background portion 215. Element 460 illustrates that logo text can be added at the portion overlapping the logo indicated at video portion 465. An element 470 indicates that further text can be added at another portion 470 of the template. FIGS. 2-4 illustrate merely one example of a user interface that can be provided to enable editing of the template by the user's computing device. Through such a user interface, the computing device can receive video data, receive text, receive audio data, and receive picture data from the requesting computing device for incorporation into the 2.5D full motion custom multi-media file. The computing device may also receive signals to change a length of the 2.5D full motion custom multi-media file.

The computing device can make available to the user the option to choose pre-stored media for incorporation into the user's video instead of, or in addition to, having the user upload media to incorporate into the video. For example, the computing device can make available to the requesting computing device a library of stored audio files or templates. In response to receiving an indication of selection of the template from the library of stored templates that includes audio, the computing device can provide for the user interface to allow the requesting computing device to send signals effecting editing of the video template to add or modify audio as part of creating the 2.5D full motion custom multi-media file. Similarly, the computing device can receive from the requesting computing device a text based message to be added as audio to the 2.5D full motion custom multi-media file. In response to receiving the text based message, the computing device can send an order to effect receipt of an audio track based on the text based message and make the audio track based on the text based message available to the requesting computing device for incorporation as part of creating the 2.5D full motion custom multi-media file per instructions received through the user interface. In this approach, the computing device can automatically place an order with a third party vendor whose business it is to provide audio voiceovers based on submitted text. The computing device will then receive from a vendor computing device an audio file corresponding to the voiceover of the text based message, which audio file can then be provided to the user via the user interface device for incorporation into the custom multi-media file. In another approach, text can be automatically converted to an audio track using known methods.

Returning again to FIG. 1, the computing device provides 120 elements of a low resolution preview of the 2.5D full motion custom multi-media file over the network for playback at the requesting computing device. The low resolution preview may be the initial template to be edited by the user or intermediate versions updated during the editing process. To be able to provide to low resolution preview according to one approach, the computing device processes the media packets from a media providing computing device when making the library of stored video templates to create a low resolution media version for use in providing a low resolution preview. Accordingly, the low resolution media version can be provided in the preview window of the user interface device. In another example, when a modified 2.5D full motion custom multi-media file is prepared and a preview is requested, the computing device analyzes the 2.5D full motion custom multi-media file to build a list of required preview elements. The computing device also determines capture methods for the elements of the 2.5D full motion custom multi-media file and transcodes elements of the 2.5D full motion custom multi-media file to create transcoded elements to use in the low resolution preview. The computing device then builds the low resolution preview of the 2.5D full motion custom multi-media file using the transcoded elements. When editing is complete, the requesting computing device will so notify the computing device, which receives 130 information relating to purchase credentials relating to the 2.5D full motion custom multi-media file. The purchase credentials can be any of a variety of forms that allow the user to pay the operator of the computing device for the service of providing the ability to create a custom 2.5D multi-media file and, optionally, to account for licensing fees incurred in connection with any of the elements used as part of the custom 2.5D multi-media file. For example, a user may pay a one-time fee for creating the single 2.5D multi-media file, or the user can buy one or more subscriptions that allow defined access to the computing device to make an unlimited or pre-defined number of 2.5D custom multi-media files. Moreover, various subscriptions can be defined that provide access to difference libraries of content that can be used in creating a given 2.5D multi-media file. In response to receiving the information relating to purchase credentials, the computing device makes available 135 the 2.5D full motion custom multi-media file to the requesting computer device. The final 2.5D multi-media file can be provided to the user in any of a variety of fashions known to those skilled in the art.

By one approach, to finalize the file prior to provision to the user, the computing device gathers elements of the 2.5D full motion custom multi-media file and renders individual frames of the 2.5D full motion custom multi-media file. The elements gathered include the audio, video, picture, text, and/or other media incorporated into the final video. The individual frames are built up of the various individual aspects of a given video as will correspond to a given frame of the video. Thus, text, video, still pictures, portions belonging to an original template, and the like that are all part of a particular image of the 2.5D full motion custom multi-media file will be compiled together into a single individual frame saved using a particular format such as a PNG format. The computing device saves the individual frames as an image sequence and encodes the image sequence together into the 2.5D full motion custom multi-media file.

Where the 2.5D full motion custom multi-media file is compiled from a data feed, the computing device processes the data feed identifying elements to compile into the 2.5D full motion custom multi-media file by compiling a data compilation identifying elements available for use. The computing device gathers elements identified in the data compilation that are needed to compile the 2.5D full motion custom multi-media file and builds a rendering packet that identifies the elements for rendering when compiling the 2.5D full motion custom multi-media file. So configured, the computing device has a list of all components that are needed to create the individual frames that are then later rendered into a video image.

In one approach, the functionality or logic described above may be embodied in a form of code that may be executed in a separate processor circuit of the computing device. If embodied in software, each block may represent a module, segment, or portion of code that comprises program instructions to implement the specified logical function(s). The program instructions may be embodied in the form of source code that comprises human readable statements written in a programming language or machine code that comprises numerical instructions recognizable by suitable execution systems such as a processor in a computer system or other system. The machine code may be converted from the source code, etc. If embodied in hardware, each block may represent a circuit or a number of interconnected circuits to implement this specified logical function. In one such example, a non-transitory computer readable medium can store instructions that cause a computing device in response to reading the instructions to perform the operations described above.

Figure 5:
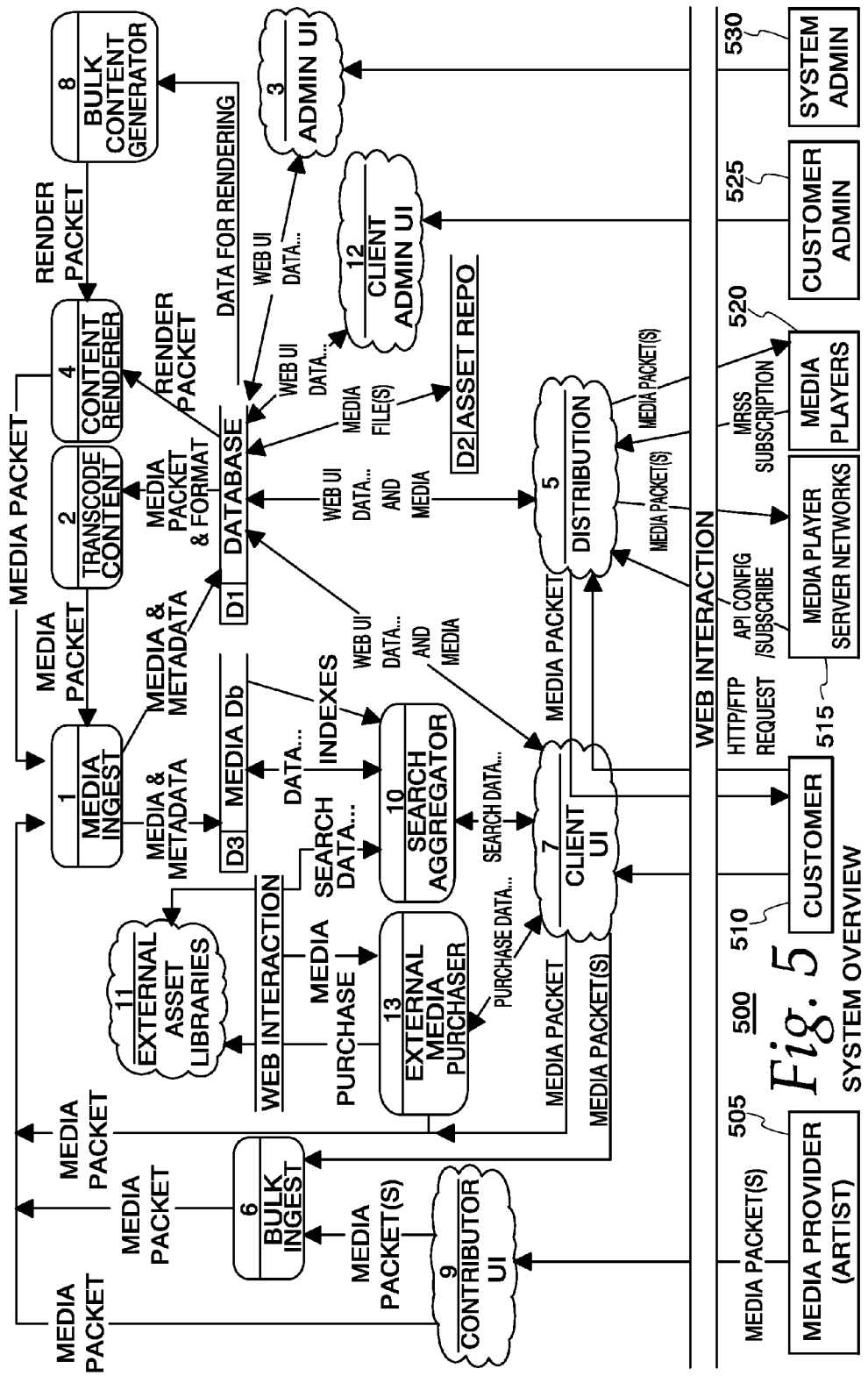
FIG. 5 comprises a block diagram of a system overview for an example approach to implementing a method such as that of FIG. 1, as configured in accordance with various embodiments of the invention.

Those skilled in the art will appreciate that the above described processes are readily enabled using a wide variety of available and/or readily configured platforms including partially or wholly programmable platforms as are known in the art or dedicated purpose platforms as may be desired for some applications. Referring now to FIG. 5, an illustrative approach to such a platform will now be provided. FIG. 5 illustrates the system overview whereby a computing system 500 is configured to execute the functions described above and is configured to have interaction over a network such as the internet with a variety of other devices controlled by other entities such as a media provider device 505, a customer device 510, a media player server network device 515, a media player device 520, a customer administrator device 525, and a system administrator device 530.

In FIGS. 5-13, each illustrated process may be performed by separate computing devices operating under the control of a single entity or by a single computing device. It will be understood that the processes described above could be executed by a single computing device or that a "computing device" may include multiple computing devices. The symbols of FIGS. 5-13 illustrate specific aspects of the illustrated example. For instance, each box with rounded corners represents a process executed by the computing device. Databases are illustrated as boxes adjacent a separate rectangle and marked with the moniker "D" with a number. These databases may be physically separate databases or simply different logical storage areas in a single database. Cloud symbols indicate interconnection processes whereby the computing system 500 communicates with other systems to effect the processes described above. A box with sharp corners represents a separate system or computing device in communication with the system 500. Data flow among the various elements is indicated by the arrows with an indication of the type of data being exchanged being provided by text associated within individual arrows.

Figure 6:
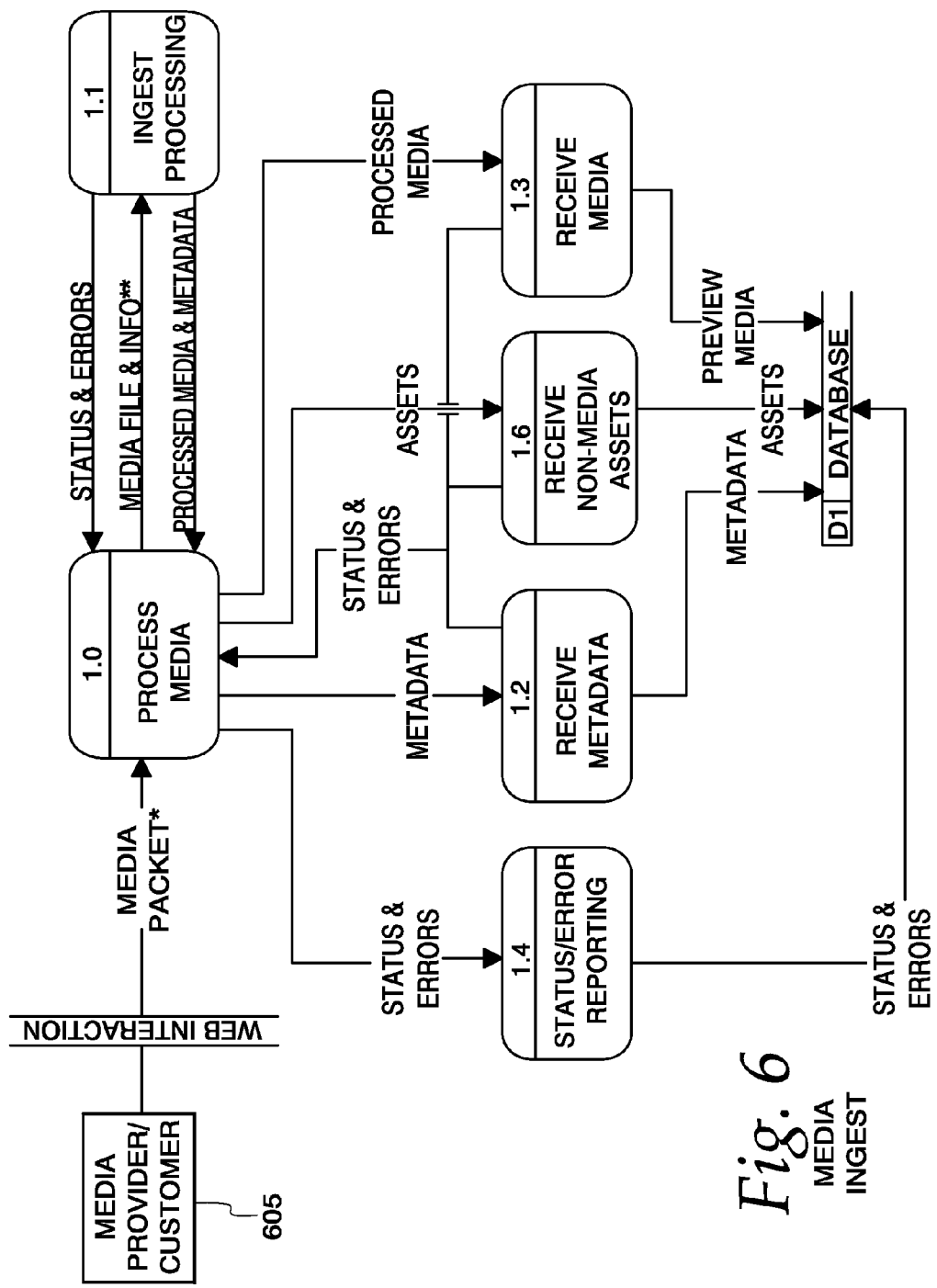
FIG. 6 comprises a block diagram of an example media ingest process as configured in accordance with various embodiments of the invention.

The system 500 of FIG. 5 includes a media ingest process 1 that accepts media files from customers and providers and processes the files for use within the system 500. Turning to FIG. 6, an example of a media ingest process 1 is illustrated. In this example, a media packet is received from a media provider or customer computing device 605 by the process media element 1.0. The media packet may include a media file, entitlement information, licensing information, and arbitrary metadata supplied by the provider of the media packet. The media file and information is provided to an ingest processing element 1.1, which returns the processed media and metadata to the process media element 1.0. The media ingest process 1 further includes a received metadata process 1.2 that receives the metadata from the process media process 1.0 and prepares the metadata for storage in the database D1. A received media process 1.3 receives the processed media from the process media process 1.0 and configures it for storage in the database D1. By one approach, the received media processed 1.3 can include a routine to provide only preview media for the database for use in the process of creating a 2.5D full motion custom multi-media file.

A receive non-media assets process 1.6 is configured to receive assets from the process media process 1.0 including full resolution media from the process media process 1.0. The various processes illustrated in FIG. 6 may also determine status messages and error messages during their normal routines. These messages are sent to the process media process 1.0, which in turn provides this information to a separate status/error reporting process 1.4. The status/error reporting process 1.4 processes the status and errors whereby such information regarding errors or status information may be provided and stored in the database D1.

Figure 7:
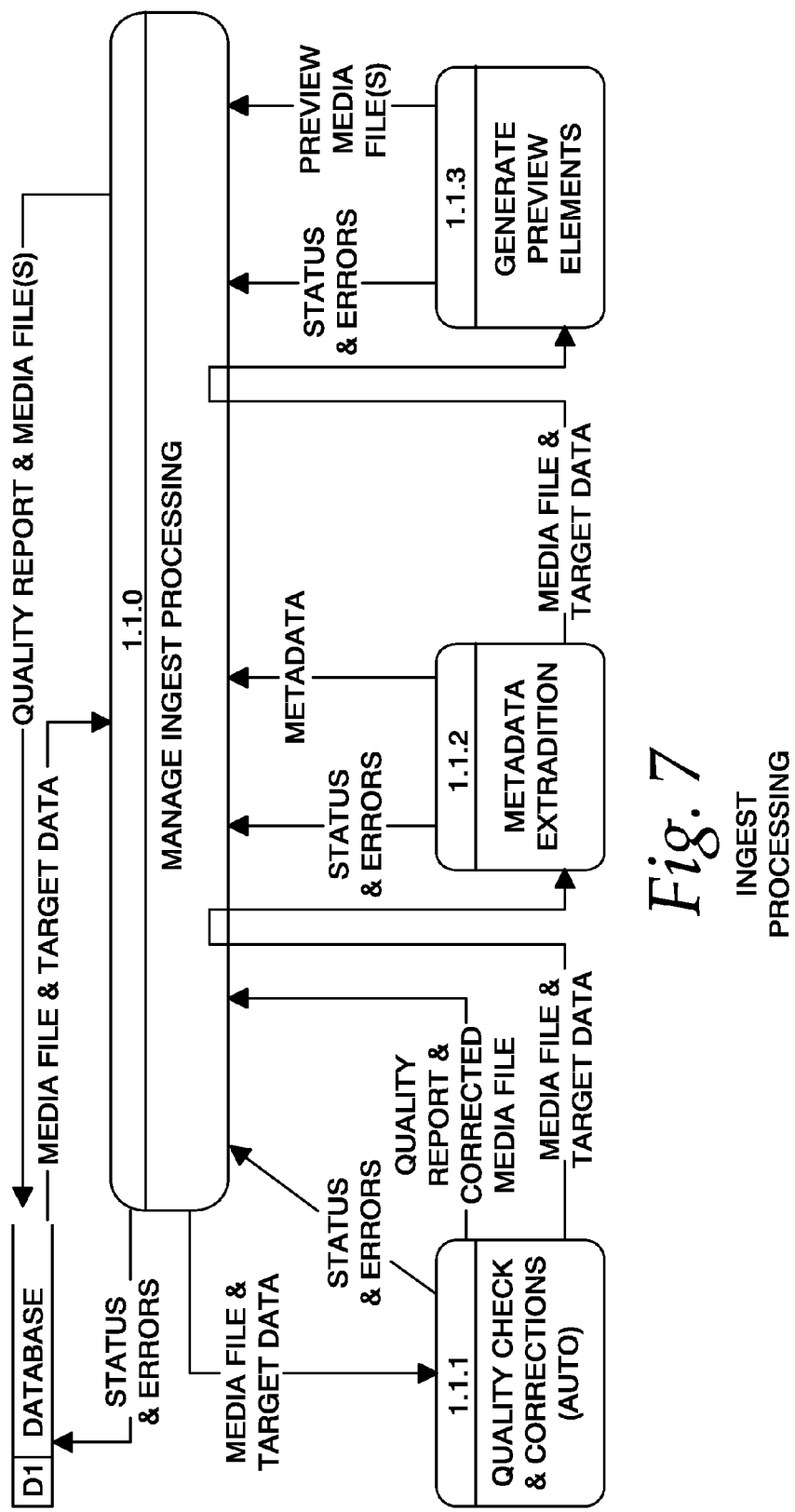
FIG. 7 comprises a block diagram of an example ingest processing process as configured in accordance with various embodiments of the invention.

Turning to FIG. 7, the example ingest process 1.1 of FIG. 6 will be further described. The ingest processing process 1.1 functions to pull apart the provided media files to extract information and create low resolution versions of the media for reference within the video editor. A manage process 1.1.0 receives the initial media file and target information or data from a database D1 or through the media ingest process 1. Its process manager 1.1.0 coordinates the processing of the data. The media file and target data are first sent to a quality check and corrections process 1.1.1. The quality check and correction process 1.1.1 checks for file integrity and usability including compatibility with a processing format for the system 500 and final form of the 2.5D custom multi-media file. If corrections to the data can be made, the quality check and corrections process 1.1.1 makes those corrections including transcoding the content as appropriate.

Figure 8:
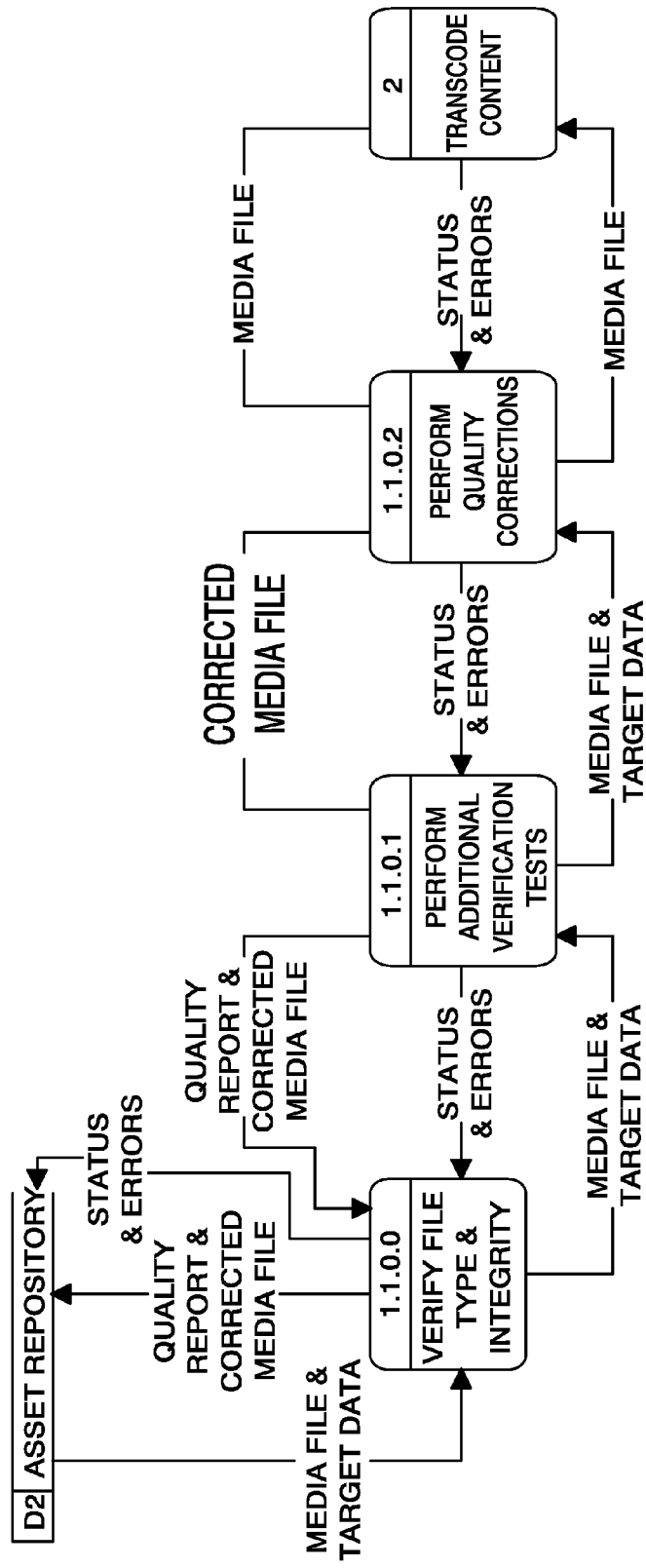
FIG. 8 comprises a block diagram of an example quality check and corrections process as configured in accordance with various embodiments of the invention.

FIG. 8 illustrates an example of quality check and corrections process 1.1.1 including a verify file type and integrity process 1.1.0.0. As the name implies, this process receives the media file and target information and verifies whether the file type and integrity of the file are sufficient for use in a custom multi-media file. Depending on the results of this process, additional verification tests may be performed in a further process at 1.1.0.1. If the additional tests confirm that quality corrections need to be made to the media, the media and target data are sent to a perform quality corrections process 1.1.0.2 that is configured to correct the media. If the quality correction includes a need to transcode the media from one media type to another, the media file is provided to a transcode content process 2 that returns the transcoded media file to the perform quality corrections process 1.1.0.2. The corrected media file is then returned to the perform additional verification tests process 1.1.0.1, which then provides a quality report and the corrected media file to the original verify file type and integrity process 1.1.0.0. The quality report and corrected media file are then provided to an asset repository database D2 for use by other processes within the system. This quality report and corrected media file are also returned to the manage ingest processing process 1.1.0, as illustrated in FIG. 7. This process also includes a metadata extraction process 1.1.2 that extracts the metadata from the media file and target data for processing into a form that the remainder of the system 500 can access and use. Lastly, the ingest processing process of FIG. 7 includes a generate preview elements process 1.1.3 that generates a preview version of the media for use in the preview mode.

Figure 9:
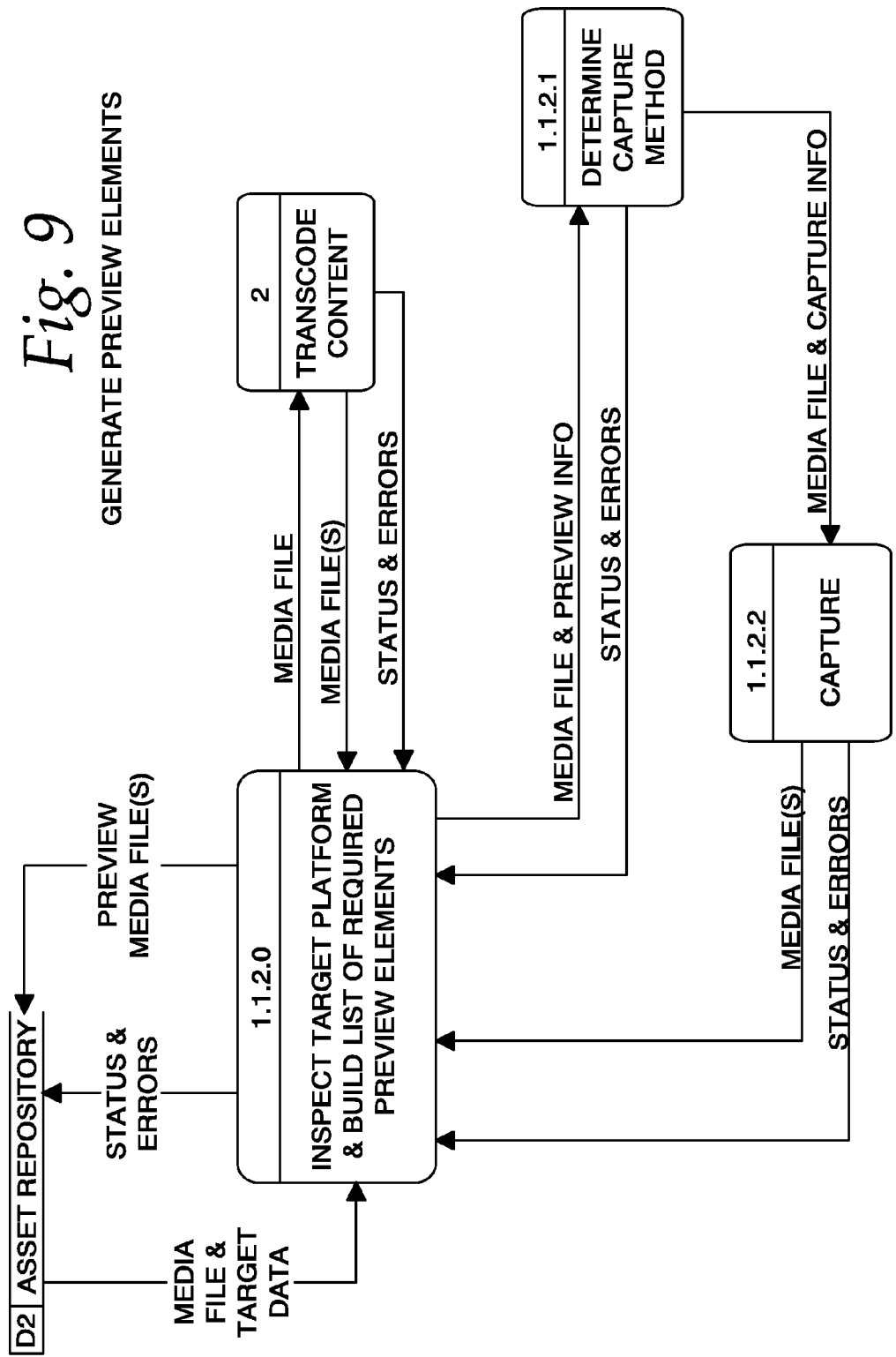
FIG. 9 comprises a block diagram of an example process to generate preview elements as configured in accordance with various embodiments of the invention.

FIG. 9 illustrates an example generate preview elements process 1.1.3 that builds a platform specific appropriate preview media asset that accurately represents the high resolution master copy of the media. In this example, the target platform is inspected and a list of required preview elements is built based upon the media file and target data received from the database or from an earlier process manage ingest process. This analysis is controlled by an inspect target platform and build list of required preview elements process 1.1.2.0. If the received media file does not have a form appropriate for the target platform, the media file is provided to a transcode content process 2 that returns transcoded media files having a file type appropriate for the target platform. As part of the preview element creation process, it may be necessary to determine the capture method using process 1.1.2.1, which capture information is used by a capture process 1.1.2.2 that will recapture the image or video in a manner that creates a low resolution media file suitable for use as part of an overall preview of the custom multi-media file. The inspect and build process 1.1.2.0 then returns the preview media files to the asset repository database D2 along with a report of any status and errors created by any of the other processes involved in creating the preview media files. In the context of the media ingest process illustrated in FIG. 7, the generate preview elements process 1.1.3 may also return the preview media files to the manage ingest process 1.1.0 for processing or reporting the process information before storage of the media files in the database.

Turning again to FIG. 5, the media ingest process 1.1 receives media for processing from a variety of sources including media from a media provider or artist computing device 505 via a contributor user interface 9 and a bulk ingest process 6 configured to receive media packets from the contributor user interface 9 and a client user interface 7. Through these user interfaces, the bulk ingest processor process 6 can receive media from a customer computing device 510, or a media provider computing device 505. The bulk ingest process 6 is configured to process large amounts of media as provided by these entities in such a way to allow the media ingest process 1 to handle the information. The media ingest process 1 can instead receive the media packet directly from the client user interface 7 if the media packet provided is not so large as to need to be processed by the bulk ingest process 6.

The transcode content process 2 is illustrated as receiving media from the database D1 and providing media packets to the media ingest process 1. The database in this example is used as a go-between various users of the overall system 500 and processes executed by the system 500 in order to create a custom multi-media file. For example, the database D1 can receive data from the client user interface 7, the administrator user interface 12, or from a system 500 administrator user interface 300 to effect communications or receive information from the consumer computing device 510, the customer administrator computing device 525, or a system administrator computing device 530. Depending on how the data is needed in the other processes, the database D1 can then be accessed by a variety of processes within the system 500. Another example of such a process is the content renderer process 4.

Figure 10:
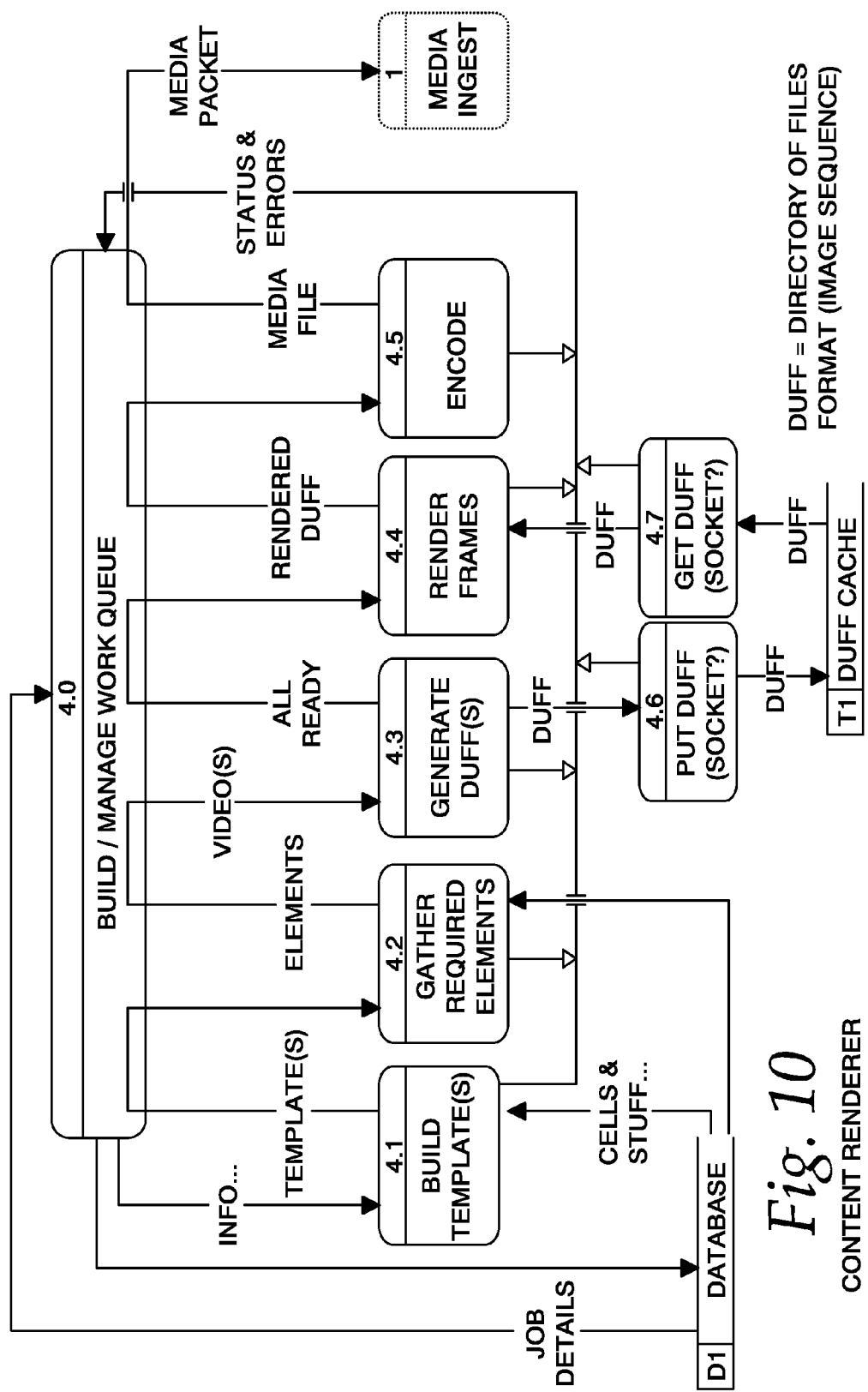
FIG. 10 comprises a block diagram of an example content renderer as configured in accordance with various embodiments of the invention.

FIG. 10 illustrates an example content renderer process configured to pull together all of the high resolution assets used in a user's composition or custom multi-media file, and builds a presentation based on that composition. Generally speaking, the presentation is played frame by frame and then captured on a frame by frame basis to create an image sequence ready for encoding into a distribution platform specific file format. A build/manage work queue process 4.0 manages the overall process. A build templates process 4.1 receives information regarding the overall work process from the work queue 4.0 and cells of the custom multi-media file from the database D1. The generated templates are then provided to a gather required elements process 4.2 that collects together all the elements for a specific frame that are collected together to create the individual frame that will later be used in the full video. The list of required elements is provided together with the video to a file format generation process 4.3 that creates a directory of files format (DUFF) that builds a table of files needed for each image of the image sequence. The DUFF information can be provided to a put DUFF process 4.6 that stores the information in a separate cache or memory T1 for later retrieval by a get DUFF process 4.7. A render frames process 4.4 renders the individual frames of a custom file and, in so doing, calls the DUFF information via the get DUFF process 4.7. The render frames process 4.4 uses the DUFF information to collect the individual media elements of the various parts of the individual frame of the video to allow the process to create the final individual frame. An encode process 4.5 encodes the individual frames together into a single video media file that represents the custom 2.5D multi-media file to be delivered to a user. This media file can be provided to the media ingest process 1 for processing to ensure safe storage and indexing of the information. Status information and error information for any of the above processes are collected and provided to the build/manage work queue process 4.0 to facilitate management of the overall process.

In a situation where bulk amounts of content need to be rendered, a bulk content generator process 8, as illustrated in FIG. 5, can pull data for rendering from the database D1 and prepare rendered packets individually to the content renderer process 4. An example bulk content generator process as illustrated in FIG. 11 processes the data feed by pulling out data to be injected into the user's composition or custom multi-media file. The composition is then copied and edited for each version of the file and handed off the rendering for final production. This process is managed by a bulk processor 7.0 designed to handle files such as spreadsheet files or feeds such as RSS feeds. A feed trigger, such as a file or RSS feed is received from the bulk processor 7.0 from a separate feed trigger device 1110. The RSS feed or file can then be incorporated into a template or video. A gather required elements process 7.1 receives information regarding the media to process from the bulk processor 7.0 and from an elements provider device 1120, which in this example is a responsive server for this process. The gathered elements are provided to a manage import process 7.3 that is designed to work with the media ingest process 1 to collect together the elements on a one by one basis until the file is fully compiled. This information is provided to a build render packet process 7.4 which information is provided to the content render 4 to facilitate the final rendering of the content as described above.

Turning back again to FIG. 5, media to be used in creating a custom multi-media file can be received not only through specific media contributors and customers, but also through other external sources. In the example of FIG. 5, a client through the client user interface 7 can interact with an external media purchase process 13 that facilitates the client's purchase of media through external asset libraries 11. When purchased, these external media assets are then provided to the media ingest process 1 as described above.

An example external media purchaser process is illustrated in FIG. 12. Generally speaking, the example process accepts purchase requests from users through a client interface. The process routes and manages the transactions with external or third party media provider partners and through internal accounting systems to facilitate purchase of the media and delivery of the media to the media ingest process in accord with target requirements. The client, through the client user interface 7, browses media purchase options and sends information regarding a final composition and purchase agreement that is received by the process purchase requirements process 13.0. The process purchase requirements process 13.0 forwards the purchase request and credentials information to a verify authenticity permission process 13.1 that acts as a screen for such purchasing requests. If the purchase requests are approved, they are provided to a route to provider process 13.2 that accesses an internal media database D3 to collect information with respect to which third party asset provider is providing the content being purchased and the rules for engagement with such third party. The route to provider process 13.2 then initiates and completes the transaction with the media asset provider or other third party media provider or artist. The database D3 may include a listing of third party media providers, the type of media that they provide, pricing structures for such media, and content information for such third party asset providers. Such information may be kept within the system 500 or as an external media asset library 11. When the transaction with the third party media asset provider is complete, the media is provided back to the system 500 via the route to provider process 13.2. The media is then, as illustrated in FIG. 5, provided to the media ingest process 1 to be processed as described above.

Figure 13:
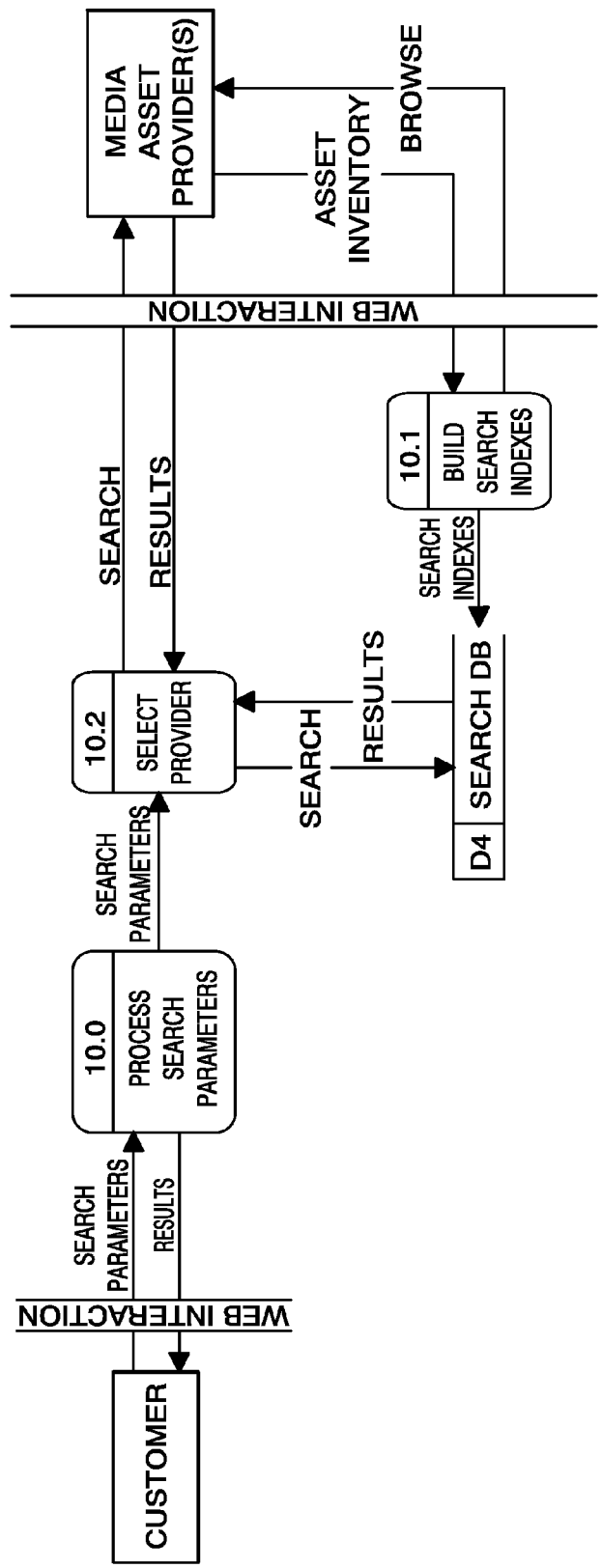
FIG. 13 comprises a block diagram of an example search aggregator as configured in accordance with various embodiments of the invention.

With all of the various media available to a user to build up a 2.5D custom multi-media file, various information processing and organization systems can be used to facilitate ease of use. For example, in FIG. 5 a search aggregator process 10 is available to a user through the client user interface 7 and uses indices provided by system databases such as database D3 to facilitate searching for and use of various stored media. FIG. 13 illustrates an example search aggregator process that accepts the user's media search parameter and gathers search results from the system 500's media library and from media provider partners having media libraries having third party libraries available for use. The search aggregator process normalizes the third party media library information for search and information provision. In response to a final selection by a user, the search aggregator process accepts a purchase identification and can handle a transaction with an external media provider. In the illustrated example, a process search parameters process 10.0 receives search parameters from the customer and returns the results to the customer device. The search parameters are provided to a select provider process 10.2 that determines which provider will be searched in response to the search request. The search provider process 10.2 can access an internal database D4 that includes search indices for both internal databases of information and information from third party media asset providers. To facilitate creation of such a database D4, a build search indices process 10.1 receives asset inventory information from third party media asset providers and processes the information to match the search indices format for the search database D4. The build search indices process 10.1 can also occasionally browse one or more media asset provider libraries to update the search database D4 as needed. Alternatively, the select provider process 10.2 can directly access the media asset provider information in response to receiving information from the search database D4 with respect to available information at a third party media asset provider.

The final 2.5D full resolution custom multi-media file can be made available to a user from the system database D1 in a variety of ways. As illustrated in FIG. 5, a distribution process 5 can receive the media and provide the media to various devices over a network interaction. For example, the media can be provided in response to receiving API (application programming interface) Config/Subscribe information from media player server networks device(s) 515. In another example, the media can be provided in response to receiving MRSS (multimedia rich site summary) subscription information from media players 520. In other words, the media file can be provided directly to video services such as YouTube or the like as requested by the user. The media can also be provided through a client user interface to the customer 510, for example, in response to HTTP/FTP requests.

So configured, a user can access a system to choose a template to edit using stock or original video, text, audio, or still images to readily create a custom 2.5D multi-media file as a fraction of the cost of producing such a video from scratch. The video can be previewed using a low resolution to facilitate fast review of the work, and a variety of pricing and licensing structures are made available to facilitate incorporation of plethora aspects into the file. The final file is then ready for download to a user for use in website advertising or the like.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A method comprising:
   receiving by a computing device over a network a request from a requesting computing device to create a 2.5D full motion custom multi-media file;
   making a library of stored video templates available to the requesting computing device by:
      receiving a media packet from a media providing computing device;
      processing the media packet with the computing device to determine errors in the media contained in the media packet;
      processing the media packet with the computing device to extract metadata associated with the media packet;
      processing the media packet with the computing device to extract assets other than the media from the media packet; and
      storing the media, metadata, and assets in a storage device configured to make the media available to the requesting computing device in accord with the metadata;
   in response to receiving an indication of selection of a video template from the library of stored video templates, providing a user interface for the requesting computing device to manipulate the template, the user interface allowing the requesting computing device to send signals effecting editing of the video template to create the 2.5D full motion custom multi-media file;

providing elements of a low resolution preview of the 2.5D full motion custom multi-media file from the computing device over the network for playback at the requesting computing device, the template configured to allow the requesting computing device to manipulate the elements of the low resolution preview of the 2.5D full motion custom multi-media file; and making available the 2.5D full motion custom multi-media file to the requesting computer device.

2. The method of claim 1 wherein the making the library of stored video templates available further comprises providing signals to the requesting computing device to effect presentation of media available for purchase from third parties over an Internet based transaction.

3. The method of claim 1 wherein the processing the media packet to determine errors comprises:
verifying the media's file type and integrity;
performing quality corrections to the media to create a corrected media file;
transcoding the corrected media file to create a transcoded media file;
returning the transcoded media file and data regarding the media's quality for storage.

4. The method of claim 1 wherein the making the library of stored video templates available further comprises:
receiving a media packet from a media providing computing device;
processing the media to create a low resolution media version for use in providing the low resolution preview of the 2.5D full motion custom multi-media file to the requesting computing device.

5. The method of claim 1 wherein the providing the low resolution preview of the 2.5D full motion custom multi-media file comprises:
analyzing the 2.5D full motion custom multi-media file to build a list of required preview elements;
determining capture methods for elements of the 2.5D full motion custom multi-media file;
transcoding elements of the 2.5D full motion custom multi-media file to create transcoded elements to use in the low resolution preview of the 2.5D full motion custom multi-media file;
building the low resolution preview of the 2.5D full motion custom multi-media file using the transcoded elements.

6. The method of claim 1 wherein creating the 2.5D full motion custom multi-media file comprises:
gathering elements of the 2.5D full motion custom multi-media file;
rendering individual frames of the 2.5D full motion custom multi-media file;
saving the individual frames as an image sequence;
encoding the image sequence together into the 2.5D full motion custom multi-media file.

7. The method of claim 1 further comprising:
processing a data feed comprising elements to compile into the 2.5D full motion custom multi-media file by compiling a data compilation identifying elements available for use;
gathering elements identified in the data compilation that are needed to compile the 2.5D full motion custom multi-media file;
building a rendering packet that identifies the elements for rendering when compiling the 2.5D full motion custom multi-media file.

8. The method of claim 1 further comprising:
making available to the requesting computing device a library of stored audio files;
in response to receiving an indication of selection of a template from the library of stored templates that includes audio, providing for the user interface to allow the requesting computing device to send signals effecting editing of the video template to add or modify audio as part of creating the 2.5D full motion custom multi-media file.

9. The method of claim 1 further comprising:
receiving from the requesting computing device a text based message to be added as audio to the 2.5D full motion custom multi-media file;
in response to receiving the text based message, sending an order to effect receipt of an audio track based on the text based message and making the audio track based on the text based message available to the requesting computing device for incorporation as part of creating the 2.5D full motion custom multi-media file per instructions received through the user interface.

10. The method of claim 1 wherein further comprising:
receiving from the requesting computing device signals through the user interface to effect editing of the video template to create the 2.5D full motion custom multi-media file.

11. The method of claim 10 wherein the receiving the signals to effect editing comprises at least one of the group consisting of:
receiving video data from the requesting computing device for incorporation into the 2.5D full motion custom multi-media file;
receiving text from the requesting computing device for incorporation into the 2.5D full motion custom multi-media file;
receiving audio data from the requesting computing device for incorporation into the 2.5D full motion custom multi-media file;
receiving picture data from the requesting computing device for incorporation into the 2.5D full motion custom multi-media file;
receiving signals to change a length of the 2.5D full motion custom multi-media file; and combinations thereof.

12. The method of claim 1 further comprising receiving information relating to purchase credentials relating to the 2.5D full motion custom multi-media file, and wherein the 2.5D full motion custom multi-media file is made available to the requesting computer device in response to the receipt of the information relating to purchase credentials.

13. An apparatus comprising:
a computing device connected to a network to receive signals from a requesting computing device;
a storage device configured to store video templates;
a storage device configured to store a modified video template as a 2.5D full motion custom multi-media file;
wherein the computing device is configured to:
receive by a computing device over a network a request from a requesting computing device to create a 2.5D full motion custom multi-media file;
make available to the requesting computing device a library of stored video templates by:
receiving a media packet from a media providing computing device;
processing the media packet with the computing device to determine errors in the media contained in the media packet;
processing the media packet with the computing device to extract metadata associated with the media packet;

processing the media packet with the computing device to extract assets other than the media from the media packet; and storing the media, metadata, and assets in a storage device configured to make the media available to the requesting computing device in accord with the metadata;

in response to receiving an indication of selection of a video template from the library of stored video templates, provide a user interface for the requesting computing device to manipulate the template, the user interface allowing the requesting computing device to send signals effecting editing of the video template to create the 2.5D full motion custom multi-media file;

provide elements of a low resolution preview of the 2.5D full motion custom multi-media file from the computing device over the network for playback at the requesting computing device, the template configured to allow the requesting computing device to manipulate the elements of the low resolution preview of the 2.5D full motion custom multi-media file; and make available the 2.5D full motion custom multi-media file to the requesting computer device.

14. The apparatus of claim 13 wherein the computing device is further configured to receive information relating to purchase credentials relating to the 2.5D full motion custom multi-media file, and wherein the 2.5D full motion custom multi-media file is made available to the requesting computer device in response to the receipt of the information relating to purchase credentials.

15. A method comprising:

receiving by a computing device over a network a request from a requesting computing device to create a 2.5D full motion custom multi-media file;

making a library of stored video templates available to the requesting computing device;

in response to receiving an indication of selection of a video template from the library of stored video templates, providing a user interface for the requesting computing device to manipulate the template, the user interface allowing the requesting computing device to send signals effecting editing of the video template to create the 2.5D full motion custom multi-media file;

providing elements of a low resolution preview of the 2.5D full motion custom multi-media file from the computing device over the network for playback at the requesting computing device by:

analyzing the 2.5D full motion custom multi-media file to build a list of required preview elements;

determining capture methods for elements of the 2.5D full motion custom multi-media file;

transcoding elements of the 2.5D full motion custom multi-media file to create transcoded elements to use in the low resolution preview of the 2.5D full motion custom multi-media file; and building the low resolution preview of the 2.5D full motion custom multi-media file using the transcoded elements, wherein the template is configured to allow the requesting computing device to manipulate the elements of the low resolution preview of the 2.5D full motion custom multi-media file; and making available the 2.5D full motion custom multi-media file to the requesting computer device.

16. The method of claim 15 further comprising receiving information relating to purchase credentials relating to the 2.5D full motion custom multi-media file, wherein the 2.5D full motion custom multi-media file is made available to the requesting computer device in response to the receipt of the information relating to purchase credentials.

17. The method of claim 16 wherein the making the library of stored video templates available further comprises:

receiving a media packet from a media providing computing device;

processing the media packet with the computing device to determine errors in the media contained in the media packet;

processing the media packet with the computing device to extract metadata associated with the media packet by:

verifying the media's file type and integrity;

performing quality corrections to the media to create a corrected media file;

transcoding the corrected media file to create a transcoded media file; and returning the transcoded media file and data regarding the media's quality for storage;

processing the media packet with the computing device to extract assets other than the media from the media packet; and storing the media, metadata, and assets in a storage device configured to make the media available to the requesting computing device in accord with the metadata.

18. The method of claim 15 wherein the making the library of stored video templates available further comprises providing signals to the requesting computing device to effect presentation of media available for purchase from third parties over an Internet based transaction.

19. The method of claim 15 wherein the making the library of stored video templates available further comprises:

receiving a media packet from a media providing computing device;

processing the media to create a low resolution media version for use in providing the low resolution preview of the 2.5D full motion custom multi-media file to the requesting computing device.

20. The method of claim 15 wherein creating the 2.5D full motion custom multi-media file comprises:

gathering elements of the 2.5D full motion custom multi-media file;

rendering individual frames of the 2.5D full motion custom multi-media file;

saving the individual frames as an image sequence;

encoding the image sequence together into the 2.5D full motion custom multi-media file.

21. The method of claim 15 further comprising:

processing a data feed comprising elements to compile into the 2.5D full motion custom multi-media file by compiling a data compilation identifying elements available for use;

gathering elements identified in the data compilation that are needed to compile the 2.5D full motion custom multi-media file;

building a rendering packet that identifies the elements for rendering when compiling the 2.5D full motion custom multi-media file.

22. The method of claim 15 further comprising:

making available to the requesting computing device a library of stored audio files;

in response to receiving an indication of selection of a template from the library of stored templates that includes audio, providing for the user interface to allow the requesting computing device to send signals effecting editing of the video template to add or modify audio as part of creating the 2.5D full motion custom multi-media file.

23. The method of claim 15 further comprising:
receiving from the requesting computing device a text based message to be added as audio to the 2.5D full motion custom multi-media file;
in response to receiving the text based message, sending an order to effect receipt of an audio track based on the text based message and making the audio track based on the text based message available to the requesting computing device for incorporation as part of creating the 2.5D full motion custom multi-media file per instructions received through the user interface.

24. The method of claim 15 wherein further comprising:
receiving from the requesting computing device signals through the user interface to effect editing of the video template to create the 2.5D full motion custom multi-media file.

25. The method of claim 24 wherein the receiving the signals to effect editing comprises at least one of the group consisting of:
receiving video data from the requesting computing device for incorporation into the 2.5D full motion custom multi-media file;
receiving text from the requesting computing device for incorporation into the 2.5D full motion custom multi-media file;
receiving audio data from the requesting computing device for incorporation into the 2.5D full motion custom multi-media file;
receiving picture data from the requesting computing device for incorporation into the 2.5D full motion custom multi-media file;
receiving signals to change a length of the 2.5D full motion custom multi-media file; and combinations thereof.

26. An apparatus comprising:
a computing device connected to a network to receive signals from a requesting computing device;
a storage device configured to store video templates;
a storage device configured to store a modified video template as a 2.5D full motion custom multi-media file;
wherein the computing device is configured to:
receive by a computing device over a network a request from a requesting computing device to create a 2.5D full motion custom multi-media file;
make available to the requesting computing device a library of stored video templates;
in response to receiving an indication of selection of a video template from the library of stored video templates, provide a user interface for the requesting computing device to manipulate the template, the user interface allowing the requesting computing device to send signals effecting editing of the video template to create the 2.5D full motion custom multi-media file;
provide elements of a low resolution preview of the 2.5D full motion custom multi-media file from the computing device over the network for playback at the requesting computing device by:
analyzing the 2.5D full motion custom multi-media file to build a list of required preview elements;
determining capture methods for elements of the 2.5D full motion custom multi-media file;
transcoding elements of the 2.5D full motion custom multi-media file to create transcoded elements to use in the low resolution preview of the 2.5D full motion custom multi-media file; and
building the low resolution preview of the 2.5D full motion custom multi-media file using the transcoded elements,
wherein the template is configured to allow the requesting computing device to manipulate the elements of the low resolution preview of the 2.5D full motion custom multi-media file; and
make available the 2.5D full motion custom multi-media file to the requesting computer device.

27. The apparatus of claim 26, wherein the computing device is further configured to receive information relating to purchase credentials relating to the 2.5D full motion custom multi-media file, wherein the 2.5D full motion custom multi-media file is made available to the requesting computer device in response to the receipt of the information relating to purchase credentials.

28. A method comprising:
receiving by a computing device over a network a request from a requesting computing device to create a 2.5D full motion custom multi-media file;
making a library of stored video templates available to the requesting computing device;
in response to receiving an indication of selection of a video template from the library of stored video templates, providing a user interface for the requesting computing device to manipulate the template, the user interface allowing the requesting computing device to send signals effecting editing of the video template to create the 2.5D full motion custom multi-media file, wherein creating the 2.5D full motion custom multi-media file comprises:
gathering elements of the 2.5D full motion custom multi-media file;
rendering individual frames of the 2.5D full motion custom multi-media file;
saving the individual frames as an image sequence; and
encoding the image sequence together into the 2.5D full motion custom multi-media file;
providing elements of a low resolution preview of the 2.5D full motion custom multi-media file from the computing device over the network for playback at the requesting computing device, the template configured to allow the requesting computing device to manipulate the elements of the low resolution preview of the 2.5D full motion custom multi-media file; and
making available the 2.5D full motion custom multi-media file to the requesting computer device.

29. The method of claim 28 further comprising receiving information relating to purchase credentials relating to the 2.5D full motion custom multi-media file, wherein the 2.5D full motion custom multi-media file is made available to the requesting computer device in response to the receipt of the information relating to purchase credentials.

30. The method of claim 28 wherein the making the library of stored video templates available further comprises providing signals to the requesting computing device to effect presentation of media available for purchase from third parties over an Internet based transaction.

31. The method of claim 28 wherein the making the library of stored video templates available further comprises:
receiving a media packet from a media providing computing device;
processing the media packet with the computing device to determine errors in the media contained in the media packet;
processing the media packet with the computing device to extract metadata associated with the media packet by:

verifying the media's file type and integrity;
performing quality corrections to the media to create a corrected media file;
transcoding the corrected media file to create a transcoded media file; and
returning the transcoded media file and data regarding the media's quality for storage;
processing the media packet with the computing device to extract assets other than the media from the media packet; and
storing the media, metadata, and assets in a storage device configured to make the media available to the requesting computing device in accord with the metadata.

32. The method of claim 28 wherein the making the library of stored video templates available further comprises:
receiving a media packet from a media providing computing device;
processing the media to create a low resolution media version for use in providing the low resolution preview of the 2.5D full motion custom multi-media file to the requesting computing device.

33. The method of claim 28 further comprising:
processing a data feed comprising elements to compile into the 2.5D full motion custom multi-media file by compiling a data compilation identifying elements available for use;
gathering elements identified in the data compilation that are needed to compile the 2.5D full motion custom multi-media file;
building a rendering packet that identifies the elements for rendering when compiling the 2.5D full motion custom multi-media file.

34. The method of claim 28 further comprising:
making available to the requesting computing device a library of stored audio files;
in response to receiving an indication of selection of a template from the library of stored templates that includes audio, providing for the user interface to allow the requesting computing device to send signals effecting editing of the video template to add or modify audio as part of creating the 2.5D full motion custom multi-media file.

35. The method of claim 28 further comprising:
receiving from the requesting computing device a text based message to be added as audio to the 2.5D full motion custom multi-media file;
in response to receiving the text based message, sending an order to effect receipt of an audio track based on the text based message and making the audio track based on the text based message available to the requesting computing device for incorporation as part of creating the 2.5D full motion custom multi-media file per instructions received through the user interface.

36. The method of claim 28 wherein further comprising:
receiving from the requesting computing device signals through the user interface to effect editing of the video template to create the 2.5D full motion custom multi-media file.

37. The method of claim 26 wherein the receiving the signals to effect editing comprises at least one of the group consisting of:
receiving video data from the requesting computing device for incorporation into the 2.5D full motion custom multi-media file;
receiving text from the requesting computing device for incorporation into the 2.5D full motion custom multi-media file;
receiving audio data from the requesting computing device for incorporation into the 2.5D full motion custom multi-media file;
receiving picture data from the requesting computing device for incorporation into the 2.5D full motion custom multi-media file;
receiving signals to change a length of the 2.5D full motion custom multi-media file; and combinations thereof.

38. An apparatus comprising:
a computing device connected to a network to receive signals from a requesting computing device;
a storage device configured to store video templates;
a storage device configured to store a modified video template as a 2.5D full motion custom multi-media file;
wherein the computing device is configured to:
receive by a computing device over a network a request from a requesting computing device to create a 2.5D full motion custom multi-media file;
make available to the requesting computing device a library of stored video templates;
in response to receiving an indication of selection of a video template from the library of stored video templates, provide a user interface for the requesting computing device to manipulate the template, the user interface allowing the requesting computing device to send signals effecting editing of the video template to create the 2.5D full motion custom multi-media file, wherein creating the 2.5D full motion custom multi-media file comprises:
gathering elements of the 2.5D full motion custom multi-media file;
rendering individual frames of the 2.5D full motion custom multi-media file;
saving the individual frames as an image sequence; and
encoding the image sequence together into the 2.5D full motion custom multi-media file;
provide elements of a low resolution preview of the 2.5D full motion custom multi-media file from the computing device over the network for playback at the requesting computing device, the template configured to allow the requesting computing device to manipulate the elements of the low resolution preview of the 2.5D full motion custom multi-media file; and
make available the 2.5D full motion custom multi-media file to the requesting computer device.

39. The apparatus of claim 38, wherein the computing device is further configured to receive information relating to purchase credentials relating to the 2.5D full motion custom multi-media file, wherein the 2.5D full motion custom multi-media file is made available to the requesting computer device in response to the receipt of the information relating to purchase credentials.

* * * * *

UNITED STATES PATENT AND TRADEMARK OFFICE
CERTIFICATE OF CORRECTION

PATENT NO. : 9,110,572 B2
APPLICATION NO. : 13/758109
DATED : August 18, 2015
INVENTOR(S) : Baron Gerhardt Page 1 of 1

It is certified that error appears in the above-identified patent and that said Letters Patent is hereby corrected as shown below:

In the Claims:

In Column 19, Line 59, Claim 37, delete "claim 26" and insert instead -- claim 36 --.

Signed and Sealed this
Twenty-first Day of June, 2016

Michelle K. Lee
*Director of the United States Patent and Trademark Office*